Patented Aug. 6, 1946

2,405,184

UNITED STATES PATENT OFFICE 2,405,184

AROMATIZING WITH CONSUMPTION OF HYDROGEN

Robert E. Burk and Everett C. Hughes, Cleveland Heights, Ohio, assignors to The Standard Oil Company, Cleveland, Ohio, a corporation of Ohio No Drawing. Application February 4, 1942, Serial No. 429,580

5 Claims. (Cl. 260—668)

In the practice of catalytic conversion of non-benzenoid hydrocarbons to aromatics, hydrogen is naturally produced. Depending upon the extent of conversion, this may go to quite large proportions. Coke is also deposited. If hydrogen be supplied from external source, with increase of pressure, there is known to be a decrease in hydrogen and coke production; but in practice the hydrogen feed has been limited in a range such that there has still been a production of hydrogen in the reaction. We have found that if the hydrogen feed be considerably increased over that heretofore practiced in the art, an operating range is reached in which a balance is obtained, no hydrogen being formed or used up, and if then the partial pressure of hydrogen be further increased, a range is encountered in which actual hydrogen consumption occurs. This is entirely distinct from hydrogenating practice, since in the latter hydrogen is consumed by being combined onto the desired hydrocarbon liquid product and in the end there is a total increase correspondingly in the molecular hydrogen content of the final liquid product; and there is also a high hydrogen pressure applied in the operation, pressures of several thousand pounds per square inch being customary. In our process, the partial pressure of hydrogen is relatively low, not exceeding 300 pounds per square inch, and it is a peculiarity that the molecular hydrogen content of the liquid products is not increased, but the hydrogen that is consumed appears in the form particularly of substantial quantities of methane, while lesser quantities of ethane, propane and butanes are formed, and coke formation is inhibited. With such process there is a particularly advantageous rate of aromatization, and the heretofore very frequent shut-downs for regenerating the catalyst are obviated.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Any of the usual non-benzenoid hydrocarbons applied for aromatizing may be treated in the process, such as aliphatic hydrocarbons, or paraffins, olefins and naphthenic hydrocarbons or their mixtures, naphthas, distillates, etc., having molecular structure involving at least six carbon atoms. Where the stock already contains some aromatic hydrocarbons, in special cases where desired these may be removed preliminarily by suitable means, such as by selective solvent extracting, formation of complexes with halides such as aluminum chloride, bromide, etc. The flow rates of the hydrocarbon to be aromatized may be 0.1–10 liquid volumes per volume of catalyst per hour. Hydrogen is also fed to the catalytic zone at 0.1–10 mols per mol of the hydrocarbon to be aromatized. The operating temperatures are 850–1100° F. Aromatizing catalysts are known as a class; and in general catalysts involving an oxide of a metal of the sixth periodic group are employed, desirably, chromium oxide not exceeding 30 mol per cent, and usually 10–30 mol per cent, with the balance a stable oxide such as aluminum oxide. Molybdenum oxide similarly, but not in excess of 20 mol per cent generally (although in some instances more may be employed), is advantageous, and in such amounts and less may also be combined with chromium oxide and predominant amounts of stable oxide such as aluminum oxide. We prefer gel type oxide catalysts in general, and especially coprecipitated aluminum and chromium oxides, such as in proportions of 80 to 20 mol per cent, or with addition of a third component, such as 1–10 mol per cent of antimony, tin, copper, etc.

Hydrogen from any suitable source is fed to the catalytic zone, with partial pressures up to, but not exceeding 300 pounds per square inch, and the rate of hydrogen feed relative to the hydrocarbon being treated may be controlled by adjusting conditions so that the hydrogen in the feed to the reaction zone is in excess of the hydrogen in the off-gas from the reaction. Hydrogen for instance may be conveniently supplied from reaction of methane or the like with steam at a temperature of around 1600° F. with catalysts such as a nickel-containing catalyst. Carbon monoxide and hydrogen are formed and the monoxide may be converted to carbon dioxide with reaction of steam and catalysts such as iron oxide-containing catalysts with or without addition of oxides of zinc, thorium, aluminum, chromium, etc. at temperatures around 930° F. The carbon dioxide formed may be removed if desired, as by contacting the gas with alkaline earth oxides such as lime etc. However, the conversion of carbon monoxide to the dioxide and removal of the carbon dioxide is not necessary where aromatizing with chromium or molybdenum containing catalysts. If desired, the hot gases as coming from the hydrogen generator need not be cooled down, but can be directly applied to provide corresponding amounts of heat. In such manner of operating, residual water vapor and carbon dioxide should be removed, as can readily be accomplished by contacting the gases with materials such as alkaline earth oxides. Methane, being one of the products of aromatization, can be particularly advantageously re-cycled to the hydrogen generator and thus provide the hydrogen for the process. Coke can be substituted in the hydrogen generator in cases where desired.

The liquid condensate obtained from the products coming off from the aromatizing zone may be distilled and used directly as a motor fuel, etc., or if desired it may be subjected to selective extraction, as for instance by sulphur dioxide or a high boiling amine or hydroxide compounds or combinations, and the undissolved or non-benzenoid portion may be re-contacted with the aromatizing catalyst or may be treated with a different catalyst, such as a promoted halide.

Other modes of applying the principle of the invention may be employed, change being made as regards the details described, provided the features stated in any of the following claims, or the equivalent of such, be employed.

We therefore particularly point out and distinctly claim as our invention:

1. In a process of treating non-aromatic hydrocarbons to convert at least a portion thereof to aromatic hydrocarbons, subjecting a non-benzenoid hydrocarbon in a catalytic zone in the presence of hydrogen to the action of an aromatizing catalyst at a temperature of 850° to 1100° F. and at a partial pressure of hydrogen not exeeding 300 pounds per square inch; adjusting the hydrogen partial pressure with reference to the temperature and the other conditions of the reaction so that the amount of hydrogen consumed during the aromatization is in excess of that produced in the process, and hydrogenation products including methane result from the feed of hydrogen to the catalytic zone in an amount greater than off-gas hydrogen as the result of the hydrogen partial pressure adjustment; segregating methane from the products from the reaction zone; converting the methane to hydrogen by steam and a catalyst; and returning hydrogen so formed to the catalytic zone to be consumed in the above recited aromatizing process.

2. In a process of treating non-aromatic hydrocarbons to convert at least a portion thereof to aromatic hydrocarbons, subjecting a non-benzenoid hydrocarbon in a catalytic zone in the presence of hydrogen to the action of a catalyst consisting of an oxide of aluminum and an oxide of a metal of the sixth group, at a temperature of 850° to 1100° F. and at a partial pressure of hydrogen not exceeding 300 pounds per square inch; adjusting the hydrogen partial pressure with reference to the temperature and the other conditions of the reaction so that the amount of hydrogen consumed during the aromatization is in excess of that produced in the process, and hydrogenation products including methane result from the feed of hydrogen to the catalytic zone in an amount greater than off-gas hydrogen as the result of the hydrogen partial pressure adjustment; segregating methane from the products from the reaction zone; converting the methane to hydrogen by steam and a catalyst; and returning hydrogen so formed to the catalytic zone to be consumed in the above recited aromatizing process.

3. In a process of treating non-aromatic hydrocarbons to convert at least a portion thereof to aromatic hydrocarbons, subjecting a petroleum naphtha in a catalytic zone in the presence of hydrogen to the action of a catalyst consisting of co-precipitated oxides comprising aluminum oxide with not over 30 mol per cent of chromium oxide and not over 20 mol per cent of another aromatizing catalytic metal oxide, at a temperature of 850° to 1100° F. and at a partial pressure of hydrogen not exceeding 300 pounds per square inch; adjusting the hydrogen partial pressure with reference to the temperature and the other conditions of the reaction so that the amount of hydrogen consumed during the aromatization is in excess of that produced in the process, and hydrogenation products including methane result from the feed of hydrogen to the catalytic zone in an amount greater than off-gas hydrogen as the result of the hydrogen partial pressure adjustment; segregating methane from the products from the reaction zone; converting the methane to hydrogen by steam and a catalyst; and returning hydrogen so formed to the catalytic zone to be consumed in the above recited aromatizing process.

4. In a process of treating non-aromatic hydrocarbons to convert at least a portion thereof to aromatic hydrocarbons, subjecting a petroleum naphtha in a catalytic zone in the presence of hydrogen to the action of a catalyst consisting of co-precipitated oxides comprising aluminum oxide with 10 to 30 mol per cent of chromium oxide, at a temperature of 850° to 1100° F. and at a partial pressure of hydrogen not exceeding 300 pounds per square inch; adjusting the hydrogen partial pressure with reference to the temperature and the other conditions of the reaction so that the amount of hydrogen consumed during the aromatization is in excess of that produced in the process, and hydrogenation products including methane result from the feed of hydrogen to the catalytic zone in an amount greater than off-gas hydrogen as the result of the hydrogen partial pressure adjustment; segregating methane from the products from the reaction zone; converting the methane to hydrogen by steam and a catalyst; and returning hydrogen so formed to the catalytic zone to be consumed in the above recited aromatizing process.

5. In a process of treating non-aromatic hydrocarbons to convert at least a portion thereof to aromatic hydrocarbons, subjecting a petroleum naphtha in a catalytic zone in the presence of hydrogen to the action of a catalyst consisting of 80:20 mol per cent of aluminum and chromium oxides, at a temperature of 850° to 1100° F. and at a partial pressure of hydrogen not exceeding 300 pounds per square inch; adjusting the hydrogen partial pressure with reference to the temperature and the other conditions of the reaction so that the amount of hydrogen consumed during the aromatization is in excess of that produced in the process, and hydrogenation products including methane result from the feed of hydrogen to the catalytic zone in an amount greater than off-gas hydrogen as the result of the hydrogen partial pressure adjustment; segregating methane from the products from the reaction zone; converting the methane to hydrogen by steam and a catalyst; and returning hydrogen so formed to the catalytic zone to be consumed in the above recited aromatizing process.

ROBERT E. BURK.
EVERETT C. HUGHES.